(12) United States Patent
Dumitras et al.

(10) Patent No.: US 7,307,639 B1
(45) Date of Patent: *Dec. 11, 2007

(54) TEXTURE REPLACEMENT IN VIDEO SEQUENCES AND IMAGES

(75) Inventors: Adriana Dumitras, Sunnyvale, CA (US); Barin Geoffry Haskell, Mountain View, CA (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/246,607

(22) Filed: Oct. 7, 2005

Related U.S. Application Data

(60) Division of application No. 11/179,701, filed on Jul. 12, 2005, which is a continuation of application No. 10/237,489, filed on Sep. 9, 2002, now Pat. No. 6,977,659.

(60) Provisional application No. 60/328,627, filed on Oct. 11, 2001.

(51) Int. Cl.
*G09G 5/00* (2006.01)

(52) U.S. Cl. ...................................... 345/582

(58) Field of Classification Search ................ 345/582, 345/583, 600, 605
See application file for complete search history.

(56) References Cited

U.S. PATENT DOCUMENTS

| | | | |
|---|---|---|---|
| 5,097,437 A | 3/1992 | Lathrop et al. | |
| 5,204,920 A | 4/1993 | Moran et al. | |
| 5,533,140 A | 7/1996 | Sirat et al. | |
| 5,680,475 A | 10/1997 | Zwierski et al. | |
| 5,872,867 A | 2/1999 | Bergen | |
| 5,926,575 A * | 7/1999 | Ohzeki et al. | 382/243 |
| 6,850,249 B1 * | 2/2005 | Gu | 345/623 |
| 6,977,659 B2 * | 12/2005 | Dumitras et al. | 345/582 |
| 2002/0122043 A1 * | 9/2002 | Freeman et al. | 345/582 |
| 2002/0171660 A1 * | 11/2002 | Luo et al. | 345/582 |
| 2003/0206176 A1 * | 11/2003 | Ritter | 345/582 |

OTHER PUBLICATIONS

Androutos, D., K.N. Plataniotis, and A.N. Venetsanapoulos. "A Novel Vector-Based Approach to Color Image Retrieval Using a Vector Angular-Based Distance Measure." Computer Vision and Image Understanding, vol. 75, Nos. 1/2. p.46-58. Jul./Aug. 1999.*

(Continued)

*Primary Examiner*—Kee M. Tung
*Assistant Examiner*—Aaron M. Richer

(57) ABSTRACT

Systems and methods for reducing bit rates by replacing original texture in a video sequence with synthesized texture. Reducing the bit rate of the video sequence begins by identifying and removing selected texture from frames in a video sequence. The removed texture is analyzed to generate texture parameters. New texture is synthesized using the texture parameters in combination with a set of constraints. Then, the newly synthesized texture is mapped back into the frames of the video sequence from which the original texture was removed. The resulting frames are then encoded. The bit rate of the video sequence with the synthesized texture is less than the bit rate of the video sequence with the original texture. Also, the ability of a decoder to decode the new video sequence is not compromised because no assumptions are made about the texture synthesis capabilities of the decoder.

14 Claims, 2 Drawing Sheets

OTHER PUBLICATIONS

"Video Coding for Low Bit Rate Communication, H.263", Feb. 1998, *ITU-T Recommendation H.263*, Series H: Audiovisual and Multimedia systems, Infrastructure of audio Visual Services—Coding of Moving Video.

H. G. Musmann, et al., "Object-oriented Analysis-synthesis Coding of Moving Images," *Signal Processing: Image Communication*, vol. 1, No. 2, pp. 117-138, Nov. 1989.

D. E. Pearson, "Developments in Model-Based Video Coding", *Proceedings of IEEE*, vol. 83, No. 6, pp. 892-906, Jun. 1995.

P. Gerken, "Object-based Analysis-synthesis Coding of Image Sequences at Very Low bit Rates," *IEEE Trans, on Circuits and Systems for Video Technology*, vol. 4, No. 3, pp. 228-235, Jun. 1994.

M. Hotter, "Optimization and Efficiency of an Object-oriented Analysis-synthesis Coder," *IEEE Trans, on Circuits and Systems for Video Technology*, vol. 4, No. 2, pp. 181-194, Apr. 1994.

A. Kaup, "Object-based Texture Coding of Moving Video in MPEG-4," *IEEE Trans, on Circuits and Systems for Video Technology*, vol. 9, No. 1, pp. 5-15, Feb. 1999.

J. Ostermann, et al., "Source Models for Content-based Video Coding", in *Proceedings of IEEE International Conference on Image Processing*, 2000, vol. 3, pp. 62-65.

J. Osterman, et al., Difference Between an Object-based Analysis-synthesis Coder and a Block-based ybrid Coder, in *Proceedings of IEEE International Conference on Image Processing*, 1995, vol. 2, pp. 398-401.

S. Hao, et al., "Smoothing Algorithms for Clip-and-Paste Model-Based Video Coding," pp. 427-435, 1999.

K. Fan, et al., "An Active Scene Analysis-based Approach for Pseudoconstant Bit-rate Video Coding," *IEEE Trans. on Circuits and Systems for Video Technology*, vol. 8, No. 2, pp. 159-170, Apr. 1998.

A. M. Dawood, et al., "MPEG Video Modelling Based on Scene Description," in *Proceedings of IEEE International Conference on Image Processing*, 1998, vol. 2, pp. 351-355.

A. Smolic, et al., "Long-term Global Motion Estimation and Its Application for Sprite Coding, Content Description and Segmentation," *IEEE Trans. on Circuits and Systems for Video Technology*, vol. 9, No. 8, pp. 1227-1242, Dec. 1999.

M. Irani, et al., "Video Indexing Based on Mosaic Representations", *Proceedings of IEEE*, pp. 905-921, May 2000.

H. Nicolas, "New Methods for Dynamic Mosaicking," *IEEE Transactions on Image Processing*, vol. 10, No. 8, pp. 1239-1251, Aug. 2001.

R. S. Jasinschi, et al., "Content-based Video Sequence Representation," in *Proceedings of IEEE International Cofnerence on Image Processing*, 1995, vol. 2, pp. 229-232.

T. Ebrahimi, et al., "Visual Data Compression for Multimedia Applications," *Proceedings of IEEE*, vol. 86, No. 6, pp. 1109, 1125, Jun. 1998.

T. Chen, et al., "Coding of Subregions for content-based Scalable Video", *IEEE Trans, on Circuits and Systems for Video Technology*, vol. 7, No. 1, pp. 256-260, Feb. 1997.

P. Campisi, et al., "A Perceptually Lossless, Model-based; Texture Compression Technique," *IEEE Transactions on Image Processing*, vol. 9 No. 8, pp. 1325-1336, Aug. 2000.

P. P. Raghu, et al., "Segmentation of Gabor-filtered Textures Using Deterministic Relaxation," *IEEE Trans. on Image Processing*, vol. 5, No. 12, pp. 1625-1636, Dec. 1996.

Y. Chen, "Novel Techniques for Image Texture Classification," Ph.D. thesis, Dept. of Electronics and Computer Science, Faculty of Engineering and Applied Science, University of Southampton, UK, 1995.

R. M. Haralick, et al., "Textural Features for Image Classification," *IEEE Trans. on Systems, Man and Cybernetics*, vol. SMC-3, No. 6, pp. 610-621, Nov. 1973.

A. K. Jain, et al., "Learning Texture Discrimination Masks," *IEEE Trans. on Pattern Analysis and Machine Intelligence*, vol. 18, No. 2, pp. 195-205, Feb. 1996.

W. Y. Ma, et al., "Texture Features and Learning Similarity," in *Proceedings of the IEEE Int. Conference on Computer Vision and Pattern Recognition*, San Francisco, CA, 1996.

T. Hall, et al., "Bispectral Analysis and Model Validation of Texture Images," *IEEE Transactions on Image Processing*, vol. 4, No. 7, pp. 996-1009, Jul. 1995.

M. Unser, "Texture Classification and Segmentation Using Wavelet Frames," *IEEE Transactions on Image Processing*, vol. 4, No. 11, pp. 1549-1560, Nov. 1995.

J. Mao, et al., Texture Classification and Segmentation Using Multiresolution Simultaneous Autoregressive Models, *Pattern Recognition*, vol. 25, No. 2, pp. 173-188, 1992.

A. C. Bovik, et al., "Multichannel Texture Analysis Using localized Spatial Filters," *IEEE Transactions on Pattern Analysis and Machine Intelligence*, vol. 12, pp. 55-73, 190.

A. K. Jain, et al., "Unsupervised Texture Segmentation Using Gabor Filters," *Pattern Recognition*, vol. 124, pp. 1167-1186, 1991.

B. S. Manjunath, et al., "Texture Features for Browsing and Retrieval of Image Data," *IEEE Transactions on Pattern Analysis and Machine Intelligence*, vol. 18, pp. 837-842.

A. Jain, et al., "A Multiscale Representation Including Opponent Color Features for Texture Recognition," *IEEE Transactions on Image Processing*, pp. 124-128, Jan. 1998.

D. J. Heeger, et al., "Pyramid-based Texture Analysis/Synthesis," in *Proceedings of SIGGRAPH'95*, 1995.

J. S. Debonet, "Multiresolution Sampling Procedure for Analysis and Synthesis of Texture Images," in *Proceedings of SIGGRAPH'97*, 1997.

A. A. Efros, et al., "Texture Synthesis by Non-parametric Sampling," in *Proceedings of IEEE International Conference on Computer Vision*, Corfu, Greece, 1999.

J. Portilla, et al., "A Parametric Texture Model Based on Joint Statistics of Complex Wavelet Coefficients," *International Journal of Computer Vision*, vol. 40, No. 1, pp. 49-71, 2000.

Y. Xu, et al., "Chaos Mosaic: Fast and Memory Efficient Texture Synthesis," *Technical Report MSR-TR-2000-32, Microsoft Research*, USA, Apr. 2000.

Z. Bar-Joseph, et al., "Texture Mixing and Texture Movie Synthesis Using Statistical Learning," *IEEE Transactions on Visualization and Computer Graphic*, vol. 7, No. 2, pp. 120-135, Apr.-Jun. 2001.

H. Greenspan, et al., "Rotation Invariant Texture Recognition Using a Steerable Pyramid," in *Proceedings of IEEE International Conference on Pattern Recognition: Computer Vision and Image Processing*, 1994, vol. 2, pp. 162-167.

H. Greenspan, et al., "Overcomplete Steerable Pyramid Filters and Rotation Invariance," in *Proceedings of IEEE International Conference on Computer vision and Pattern Recognition*, 1994, pp. 222-228.

R. Manduchi, et al., "Pyramidal Implementation of Deformable Kernels," in *Proceedings of IEEE International Conference on Image Processing*, 1995, vol. 1, pp. 378-381.

W. T. Freeman, et al., "The design and Use of Steerable Filters," IEEE *Transactions on Pattern Analysis and Machine Intelligence*, vol. 13, No. 9, pp. 891-906, 1991.

J. A. Cadzow, et al., "Image Texture Synthesis-by-analysis Using Moving-average Models," *IEEE Transaction on Aerospace and Electronic Systems*, vol. 29, No. 4, pp. 1110-1122, Oct. 1993.

G. Jacovitti, et al., "Texture Synthesis-by-analysis with Hardlimited Guassian Processes," *IEEE Transactions on Image Processing*, vol. 7, No. 11, pp. 1615-1621, Nov. 1998.

P. Campisi, et al., "Reduced Complexity Modeling and Reprodtion of Colored Textures," *IEEE Transactions on Image Processing*, vol. 9, No. 3, pp. 510-518, Mar. 2000.

Z. Bar-Joseph, et al., "Statistical Learning of Multi-dimensional Textures," *Master's Thesis*, Institute of Computer Science, The Hebrew University of Jerusalem, Israel, Apr. 1999.

M. O. Szummer, "Temporal Texture Modeling," *Master's Thesis,*, Electrical Engineering and Computer Science Department, Massachusetts Institute of Technology, USA, Sep. 2001.

A. Schodl, et al., "Video Textures," in preprint, 2001.

A. Dumitras, et al., "Angular Map-driven Snakes with Application to Object Shape Description in Color Images," accepted for publication *in IEEE Transactions on Image Processing*, 2001.

A. Dumitras, et al., "Color Image-based Angular Map-driven Snakes," in *Proceedings of IEEE International Conference on Image Processing*, Thessaloniki, Greece, Oct., 2001.

Y. Fu, et al., "Occlusion Adaptive Motion Snake," *Proceedings of IEEE International Conference on Image Processing*, 1998, vol. 3, pp. 633-637.

A. Mojsilovic, et al., "The Vocabulary and Grammar of Color Patterns", *IEEE Transactions on Image Processing*, vol. 9, No. 3, pp. 417-431, Mar. 2000.

A. Mojsilovic, et al., "Matching and Retrieval Based on Vocabulary and Grammar of Color Patterns," *IEEE Transactions on Image Processing*, vol. 9, No. 1, pp. 38-54, Jan. 2000.

G. Qui, "Pattern Colour Separable Image Coding for Content-based Indexing," in *Proceedings of IEEE Workshop on Multimedia Signal Processing*, 1999, pp. 407-412.

M. M. Gorkin, et al., "Texture Orientations for Sorting Photos 'at a glance',"in *Proceedings of IAPR Conference on Pattern Recognitions*, Jerusalem, Israel, 1994, vol. 1, pp. 459-464.

A. Ravishankar Rao, et al., "Computing Oriented Texture Fields," in *Proceedings of IEEE International Conference on Computer Vision and Pattern Recognition*, 1989, pp. 61-68.

* cited by examiner

TEXTURE REPLACEMENT IN VIDEO SEQUENCES AND IMAGES

This application is a divisional of application Ser. No. 11/179,701, filed on Jul. 12, 2005, which is a continuation of application Ser. No. 10/237,489, filed on Sep. 9, 2002, which claims the benefit of U.S. Provisional Patent Application Ser. No. 60/328,627, entitled "A Texture Replacement Method at the Encoder for Bit Rate Reduction of Compressed Video," filed Oct. 11, 2001. The contents of each of these applications is incorporated herein by reference.

RELATED APPLICATIONS

This application is related to commonly assigned U.S. patent application Ser. No. 10/237,488 entitled "System And Method For Encoding And Decoding Using Texture Replacement," filed Sep. 9, 2002 by Adriana Dumitras and Barin Geoffry Haskell and claiming priority to U.S. Provisional Patent Application Ser. No. 60/360,027, filed Feb. 12, 2002. This above-identified application is incorporated by reference herewith.

BACKGROUND OF THE INVENTION

1. The Field of the Invention

The present invention relates to systems and methods for reducing a bit rate of a video sequence. More particularly, the present invention relates to systems and methods for reducing a bit rate of a video sequence by replacing original texture of the video sequence with synthesized texture at the encoder.

2. Background and Relevant Art

One of the goals of transmitting video sequences over computer networks is to have a relatively low bit rate while still maintaining a high quality video at the decoder. As technology improves and becomes more accessible, more users are leaving the realm of 56K modems and moving to Digital Subscriber Lines (DSL), including VDSL and ADSL, which support a higher bit rate than 56K modems. VDSL, for example, supports bit rates up to 28 Mbits/second, but the transmission distance is limited. The maximum transmission distance for a 13 Mbits/second bit rate is 1.5 km using VDSL. ADSL, on the other hand, can support longer distances using existing loops while providing a bit rate of approximately 500 kbits/second.

Video standards, such as MPEG-2, MPEG-4, and ITU H.263, can achieve bit rates of 3 to 9 Mbits/second, 64 kbits to 38.4 Mbits/second, and 8 kbits to 1.5 Mbits/second, respectively. Even though video sequences with bit rates of hundreds of kbits/second can be achieved using these standards, the visual quality of these video sequences is unacceptably low, especially when the content of the video sequences is complex.

Solutions to this problem use model-based analysis-synthesis compression methods. Model-based analysis-synthesis compression methods perform both analysis and synthesis at the encoder to modify parameters in order to minimize the error between the synthesized model and the original. The resulting parameters are transmitted to the decoder, which is required to synthesize the model again for the purpose of reconstructing the video sequence.

Much of the model-based analysis-synthesis compression methods have focused on modeling human head-and-shoulders objects while fewer attempts have modeled background objects. Focusing on human head-and-shoulder objects often occurs because in many applications, such as videoconferencing applications, the background is very simple. However, background modeling may also achieve a significant reduction of the bit rate as the bit rate of I (intra) frames is often dependent on the texture content of each picture. To a lesser extent, the bit rate of B (bi-directionally predicted) frames and P (predicted) frames is also affected by texture content as moving objects uncover additional background objects.

One proposal for reducing the bit rate is to use sprite methods on the background objects. Sprites are panoramic pictures constructed using all of the background pixels that are visible over a set of video frames. Instead of coding each frame, the sprite is compressed and transmitted. The background image can be reconstructed using the sprite and associated camera motion parameters. Sprite methods require exact object segmentation at the encoder, which is often a difficult task for complex video sequences. In addition, the motion or shape parameters that are transmitted with the sprite consume some of the available bit rate. These limitations may be addressed by filtering the textured areas. Unfortunately, different filters must be designed for various textures.

Texture replacement has also been proposed as a method of background modeling. In one example, the original texture is replaced with another texture that is selected from a set of textures. However, this requires that the set of replacement textures be stored at the encoder. In another example, the texture of selected regions is replaced at the encoder with pixel values that represent an "illegal" color in the YUV color space. At the decoder, the processed regions are recovered using chroma keying. There is an explicit assumption that texture synthesis, using texture parameters sent from the encoder, followed by mapping of the synthesized texture onto the decoded video sequences, is performed at the decoder. This method therefore assumes that the reconstruction is performed at the decoder using a method that is dependent on the decoder's processing capabilities. The drawbacks of these approaches are that the processing capabilities of the decoder are assumed and that the computational costs of the decoding stage are increased.

BRIEF SUMMARY OF THE INVENTION

These and other limitations of the prior art are overcome by the present invention which relates to systems and methods for reducing the bit rate of a video sequence through texture replacement at the encoder. The capabilities of the decoder are not assumed and the decoder is not required to perform texture analysis and synthesis. The synthesized texture that replaces the original texture has similar perceptual characteristics to the original texture. Thus, the video sequence with the synthesized texture is visually similar to the original video sequence. The bit rate of the video sequence with synthesized textures is reduced because the synthesized textures that have replaced the original textures can be coded more effectively.

Texture replacement, in accordance with the present invention, occurs at the encoder and is therefore independent of the capabilities of the decoder. Texture replacement begins by selecting and removing texture from some or all of the original frames in the video sequence. The removed texture is analyzed to obtain texture parameters. Then, new texture is synthesized using the texture parameters in combination with a set of qualitative constraints. The synthesized texture can be compressed more effectively than the original texture and is also similar to, yet distinguishable from, the original texture. After the new texture is synthesized, the synthesized texture is inserted back into the original frames and the video sequence that includes the synthesized texture is encoded. Advantageously, the bit rate of the compressed video sequence with the synthesized texture is lower than the bit rate of the compressed video sequence with the original texture.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to systems and methods for texture replacement in video sequences and to reducing bit rates of video sequences through texture replacement. The bit rate of a compressed video sequence is reduced because the synthesized texture can be more effectively compressed than the original texture. Because the texture replacement occurs as part of the encoding process, the computational costs of the decoder are not increased and the processing/synthesizing capabilities of the decoder are not assumed.

Figure 1:
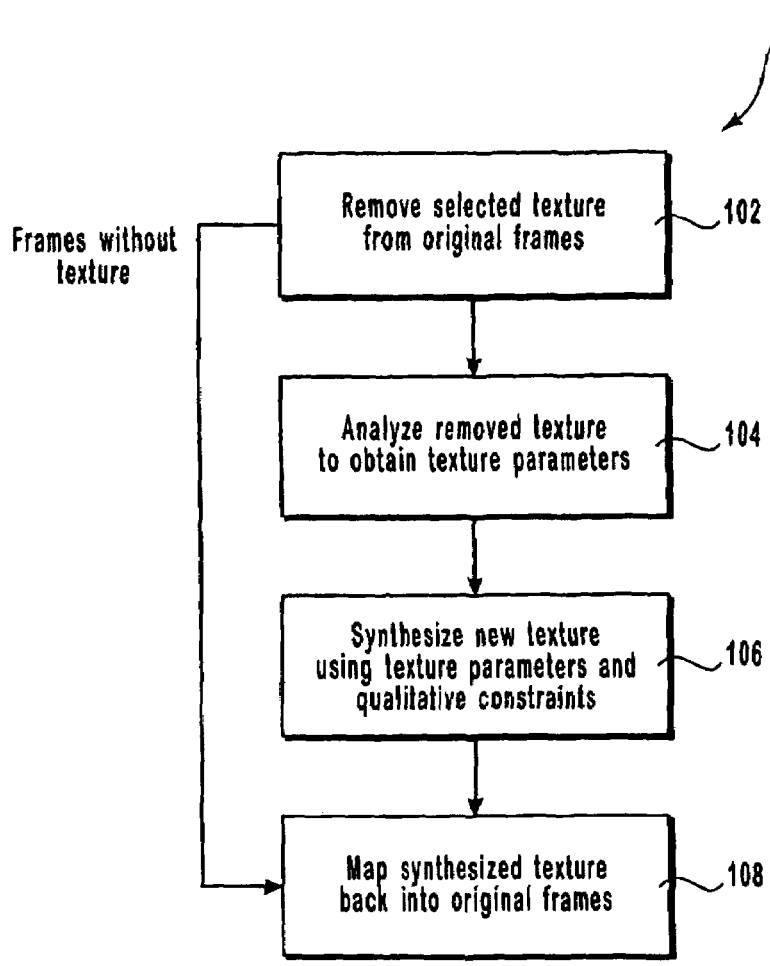
FIG. 1 is a flow diagram illustrating an exemplary method for reducing a bit rate of a video sequence by replacing original texture with synthesizing texture.

FIG. 1 is a flow diagram that illustrates one embodiment of a method for replacing texture in a video sequence and for reducing the bit rate of the encoded video sequence. Reducing the bit rate of a video sequence begins by removing selected texture from a frame or from a series of frames included in the video sequence (102). Typically, texture from a single frame is identified, while the identified texture from that particular frame is removed from a set of frames. This eliminates the need to identify texture in each frame, which would increase the computational costs of texture replacement. After the original texture has been removed from the selected frame, the removed texture is analyzed (104) to obtain texture parameters. The texture parameters, in combination with a set of constraints, are used to generate synthesized texture (106). The synthesized texture is then inserted into the original frames (108) from which the original texture was removed.

One advantage of texture replacement is that the synthesized texture can be compressed more effectively than the original texture. The ability to more effectively compress the synthesized texture results in a reduced bit rate for the encoded video sequence. The constraints are applied during the synthesis of the new texture to ensure that the synthesized texture is similar to the original texture. This is useful, for example, in order to retain the artistic representation of the original frames. However, the present invention does not require that the synthesized texture resemble the original texture.

Figure 2:
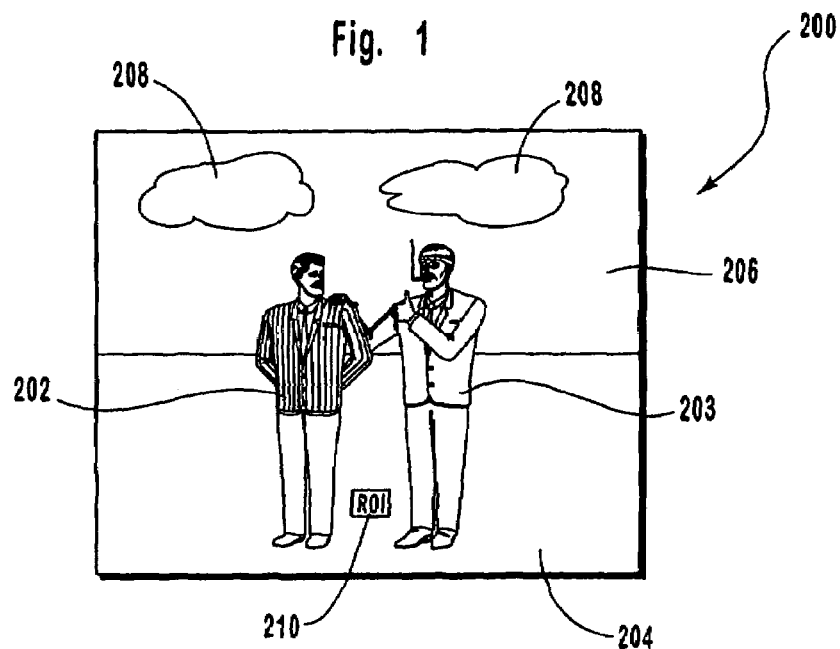
FIG. 2 illustrates a frame that includes various candidate textures which can be replaced with synthesized textures.
Figure 3:
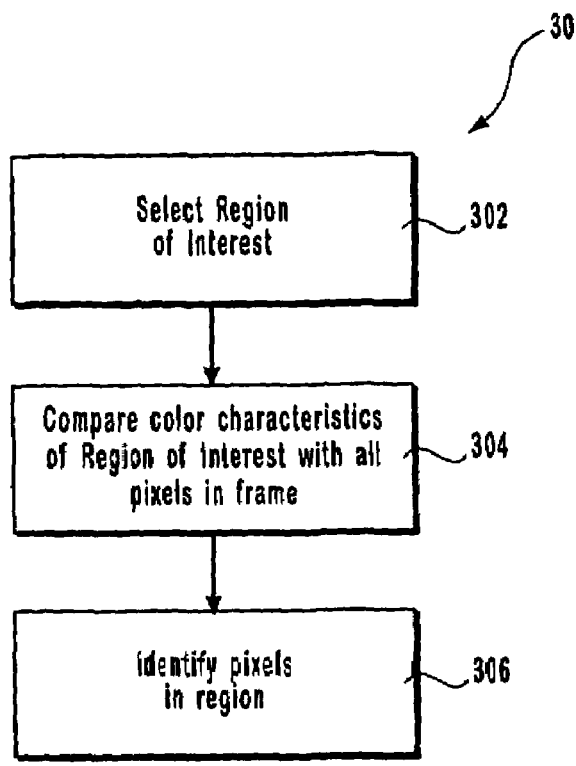
FIG. 3 is a flow diagram of a method for removing original texture from various frames of a video sequence.

FIGS. 2 and 3 more fully illustrate how texture is selected and removed from the original frames of a video sequence. FIG. 2 illustrates an exemplary frame 200. The frame 200 is a picture that, in this example, includes a person 202, a person 203 and a background. The frame 200 includes several textures that can be selected for removal. Texture refers to those portions or regions of a frame that have the same or similar characteristics and/or appearance. Usually, the background is the primary source of texture, although the present invention is not limited to background textures. One reason for selecting background textures is that these same textures or regions are present in multiple frames and in substantially the same locations. For example, if no movement is present in a particular set of frames, the background will remain constant across the set of frames. However, the systems and methods described herein can be applied even when a set of frames includes moving objects.

In this example, the background includes several candidate textures that can be selected for removal. The background of the frame 200 includes the ground texture 204, the sky texture 206 and the cloud texture 208. Each of these objects in the background are examples of textures. It is likely that the region of the frame 200 covered by the ground texture 204, the sky texture 206, or the cloud texture 208, respectively, have similar appearances or characteristics.

When a region of texture is selected for removal, it is useful to select a texture that has a spatial region of support that covers a reasonable part of the frame area over a sufficiently large number of frames. In one embodiment, a texture that covers an area that is larger than 30% of the frame area is typically selected, although the present invention can apply to any texture, regardless of the frame area occupied by the selected texture. In addition, selecting a texture that can be replaced in a large number of frames is advantageous because it has an impact on the bit rate of the encoded video sequences.

It is also useful to select a texture that belongs to a class of textures that are amenable to replacement. Generally, candidate textures include regions of a frame that have similar characteristics and/or appearance. Exemplary textures include natural textures (foliage, grass, ground, water, sky, building facades, etc.), and the like that can be identified in video sequences of test sequences such as movie sequences. Frames with replaceable texture typically have absent or slow global motion and/or only a few moving objects. Thus, the present invention can be applied to particular frame sequences within a video sequence and does not have to be applied to the entire video sequence.

Texture Removal and Region Segmentation

FIG. 3 illustrates a flow diagram illustrating how a texture is selected and removed from the frame illustrated in FIG. 2.

First, a region of interest (ROI) 210 is selected within the texture to be replaced (302). In this example, the selected ROI 210 is within the ground texture 204. The ROI 210 typically includes more than one pixel. The ROI 210, for example, may include a 7×7 array of pixels. After the ROI 210 is selected, the color characteristics of the ROI 210 are compared to the color characteristics (304) of all pixels within the frame 200. The pixels that have similar characteristics are classified or identified as belonging to the same region (306) as the ROI 210. The pixels identified in this manner are thus included in the texture that will be removed from the frame(s). The pixels that are in the identified region are removed and are temporarily replaced with pixels that have an arbitrary value. In one embodiment, the replacement pixels have a constant value equal to the mean color of the selected and identified region.

More particularly in one embodiment, region segmentation and texture removal occurs in stages. For example, let a color frame be represented by a set of two-dimensional planes in the YUV color space. Each of these image planes is represented as a matrix and each matrix element includes a pixel value in row i and column j. More specifically, the Y frames consist of all of the pixels $\{(i,j),$ with $1 \leq i \leq M, 1 \leq j \leq N\}$. First, original frames from the YUV color space are converted to the RGB color space. Second, the location $\{i_r, j_r\}$ is selected from a region-of-interest, such as the ground texture 204 shown in FIG. 2, and the ROI is constructed from:

$$ROI_r = \{i = i_r + k_i, j = j_r + k_j\}, \text{with} -\left[\frac{w_r}{2}\right] \leq k_i, k_j \leq \left[\frac{w_r}{2}\right], \quad (1)$$

where the operator [ ] denotes "the integer part of" and $w_r$ is odd. Alternatively, the region-of-interest of a size equal to $w_r \times w_r$ pixels can be manually selected from a region of interest. The pixel values are smoothed by applying an averaging filter to the ROI 210 in each of the R, G and B color planes, and the mean vector $[\mu_r^R \mu_r^G \mu_r^B]$ is computed, where $\mu_r^R, \mu_r^G, \mu_r^B$ stand for the mean values within the ROI in the R, G, and B color planes, respectively.

Next, the angular map and the modulus map of the frame are computed as follows:

$$\theta(i,j) = 1 - \frac{2}{\pi} \arccos\left(\frac{v_{(i,j)} v_{ref}}{\|v_{(i,j)}\| \|v_{ref}\|}\right), \text{ and} \quad (2)$$

$$\eta(i,j) = 1 - \frac{\|v_{(i,j)} - v_{ref}\|}{\sqrt{3 \times 255^2}}, \quad (3)$$

respectively, with respect to a reference color vector. The following works more fully describe angular and modulus maps and are hereby incorporated by reference: (1) Dimitris Androutsos, Kostas Plataniotis, and Anastasios N. Venetsanopoulous, "A novel vector-based approach to color image retrieval using a vector angular-based distance measure," *Computer Vision and Image Understanding*, vol. 75, no. ½, pp. 46-58, July/August 1999; (2) Adriana Dumitras and Anastasios N. Venetsanopoulos, "Angular map-driven snakes with application to object shape description in color images," accepted for publication in *IEEE Transactions on Image Processing.*, 2001; and (3) Adriana Dumitras and Anastasios N. Venetsanopoulos, "Color image-based angular map-driven snakes," in *Proceedings of IEEE International Conference on Image Processing*, Thessaloniki, Greece, October, 2001. Notations $v_{(i,j)}$ and $v_{ref}$ stand for a color vector [R(i,j) G(i,j) B(i,j)] in the RGB color space, and the reference vector that is selected to be equal to $[\mu_r^R \mu_r^G \mu_r^B]$, respectively. The notation $\theta$ stands for the value of the angle given by (2) between the vector $v_{(i,j)}$ and the reference vector $v_{ref}$. The notation $\eta$ stands for the value of the modulus difference given by (3) between the vector $v_{(i,j)}$ and the reference vector $v_{ref}$, respectively.

In order to identify the pixels that have similar color characteristics to those of the reference vector, the distance measure is computed by $$d^{\theta\eta}(i,j) = \exp\left[-\theta(i,j)\eta(i,j)\right] \quad (4)$$

and the mean distance given is computed by $$\mu \frac{d}{r} = \varepsilon\{d^{\theta\eta}(i,j)\}, \quad (5)$$

where notation $\varepsilon$ stands for a mean operator over $ROI_r$. All of the pixels within the frame that satisfy the constraint $$\left(d^{\theta\eta}(i,j) - \mu\frac{d}{r}\right)^2 \langle \varepsilon c \quad (6)$$

are clustered into regions.

Next, the segmented regions that satisfy the constraint of (6) are identified and labeled. In one embodiment, all regions with a normalized area $A_R$ smaller than a threshold area, i.e., $$\frac{Ar}{MN} \leq \varepsilon A$$

where M×N is the frame area, are discarded. The remaining regions are labeled. If a segmentation map consisting of all of the segmented regions is not considered acceptable by the user, another ROI location is selected and processed as described above. The labeled regions are removed from the frame and texture removal of the current frame is complete. The frames having the texture and color removed using the segmentation map are obtained at the end of the texture removal stage.

To summarize, the region segmentation and texture removal procedures described above identify pixels in the original frame that have similar characteristics in terms of color to those of the pixel (location) or ROI selected by the user. The color characteristics of the identified pixels or segmented regions are evaluated using an angular map and a modulus map of the color vectors in the RGB color space. Angular maps identify significant color changes within a picture or frame, which typically correspond to object boundaries, using snake models. To identify color changes or boundaries, simple gray-level edge detection is applied to the angular maps. Identification of major change of direction in vector data and color variation computation by differences between inside and outside contour points can also be applied. In the present invention, however, a classification of the pixels is performed in each frame using the angular map. Despite the fact that the performance of the color-based region segmentation stage depends on the selection of the threshold values єC, єA and the size of the ROI, the values of these parameters may be maintained constant for various video sequences.

Texture Analysis

Analyzing the removed texture includes computing a set of texture parameters from the removed texture. In one embodiment, a parametric statistical model is employed. This model, which employs an overcomplete multiscale wavelet representation, makes use of steerable pyramids for image decomposition. Steerable pyramids as known in the art more fully discussed in the following article, which is hereby incorporated by reference: Javier Portilla and Eero P. Simoncelli, "A parametric texture model based on joint statistics of complex wavelet coefficients," *International Journal of Computer Vision*, vol. 40, no. 1, pp. 49-71, 2000. The statistical texture descriptors are based on pairs of wavelet coefficients at adjacent spatial locations, orientations and scales (in particular, the expected product of the raw coefficient pairs and the expected product of their magnitudes), pairs of coefficients at adjacent scales (the expected product of the fine scale coefficient at adjacent scale coefficient), marginal statistics and lowpass coefficients at different scales.

Figure 4:
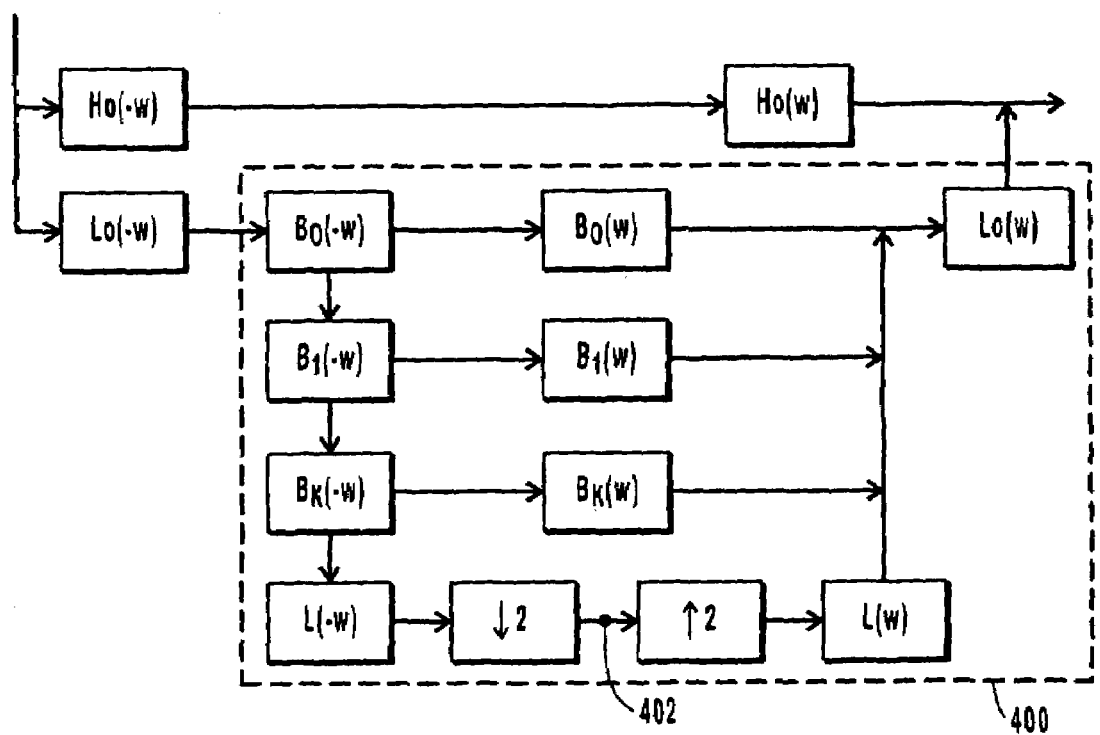
FIG. 4 illustrates a recursive transform used in image decomposition to obtain texture parameters.

First, a steerable pyramid decomposition is obtained by recursively decomposing the texture image into a set of oriented subbands and lowpass residual band. The block diagram of the transform is illustrated in FIG. 4, where the area enclosed by the dashed box 400 is inserted recursively at the point 402. Initially, the input image is decomposed into highpass and lowpass bands using the exemplary filters $$L_0(r,\theta) = \frac{L\left(\frac{r}{2},\theta\right)}{2} \text{ and } H_0(r,\theta) = H\left(\frac{r}{2},\theta\right).$$

The lowpass band is then decomposed into a lower frequency band and a set of oriented bands. The filters used in this transformation are polar-separable in the Fourier domain and are given by:

$$L(r,\theta) = \begin{cases} 2\cos\left(\frac{\pi}{2}\log_2\left(\frac{4r}{\pi}\right)\right), & \frac{\pi}{4} < r < \frac{\pi}{2} \\ 2, & r \leq \frac{\pi}{4} \\ 0, & r \geq \frac{\pi}{2} \end{cases}, \text{ and}$$

$$B_k(r,\theta) = H(r)G_k(\theta), k \varepsilon \lfloor 0, K-1 \rfloor \text{ where}$$

$$H(r) = \begin{cases} \cos\left(\frac{\pi}{2}\log_2\left(\frac{2r}{\pi}\right)\right), & \frac{\pi}{4} \langle r \langle \frac{\pi}{2} \\ 1, & r \geq \frac{\pi}{2} \\ 0, & r \leq \frac{\pi}{4} \end{cases}, \text{ and}$$

-continued $$G_k(\theta) = \begin{cases} 2^{K-1}\frac{(K-1)!}{\sqrt{K[2(K-1)]!}}\left[\cos\left(\theta-\frac{\pi K}{K}\right)\right]^{K-1}, & \left|\theta-\frac{\pi K}{K}\right|\langle\frac{\pi}{2} \\ 0, & \text{otherwise.} \end{cases}$$

The notations r and θ stand for polar coordinates in the frequency domain, K denotes the total number of orientation bands.

Statistical texture descriptors are computed using the image decomposition previously obtained. More specifically, marginal statistics, correlations of the coefficients, correlations of the coefficients' magnitudes and cross-scale phase's statistics are computed. In terms of marginal statistics (a) the skewness and kurtosis of the partially reconstructed lowpass images at each scale, (b) the variance of the highpass band, (c) the mean variance, skewness and kurtosis and (d) the minimum and maximum values of the image pixels (range) are computed at each level of the pyramid. In terms of coefficient correlations, the autocorrelation of the lowpass images computed at each level of the pyramid decomposition is computed. In terms of magnitude correlation, the correlation of the complex magnitude of pairs of coefficients at adjacent positions, orientations and scales is computed. More specifically, (e) the autocorrelation of magnitude of each subband, (f) the crosscorrelation of each subband magnitudes with those of other orientations at the same scale, and (g) the crosscorrelation of subband magnitudes with all orientations at a coarser scale are obtained. Finally, in terms of cross-scale statistics, the complex phase of the coarse-scale coefficients is doubled at all orientations and then the crosscorrelation between these coefficients and the fine-scale coefficients is computed. Doubling of the coarse-scale coefficients is motivated by the fact that the local phase of the responses to local feature such as edges or lines changes at a rate that is, for fine-scale coefficients, twice the rate of that of the coefficients at a coarser scale.

Texture Synthesis

During texture synthesis, a synthesized texture is created that can be compressed more effectively than the original texture. In one embodiment, the synthesized texture is similar to, yet distinguishable from, the original texture. Because the synthesized texture can be compressed more effectively, the bit rate of the compressed frames with synthesized texture is lower than the bit rate of the compressed frames with the original texture. Retaining the visual similarity ensures that the frames with synthesized texture convey the same artistic message as that of the frames with the original texture.

A set of qualitative texture synthesis constraints are used to achieve visual similarity between the synthesized texture and the original texture. The texture parameters selected for texture synthesis are derived using the set of qualitative constraints.

In one embodiment, the synthesis of a new texture that is visually similar to the original texture is subject to constraints in terms of dominant texture orientation, and overall color and color saturation. Exemplary constraints include, but are not limited to:

(C1) Marginal statistics;
(C2) Coefficient correlations;
(C3) Coefficient magnitude correlations;
(C4) Cross-scale statistics;

(C5) Overall color; and (C6) Color saturation.

If the original texture that has been removed from the original frames is structured and busy, the synthesized texture is subject to the constraints C1, C2, C3, C4, C5 and C6. If the original texture is unstructured and smooth, the synthesized texture is subject to the constraints C3, C4, C5 and C6.

Using these constraints, the new texture is synthesized by first decomposing an image containing Gaussian white noise using a complex steerable pyramid. Next, a recursive coarse-to-fine procedure imposes the statistical constraints on the lowpass and bandpass bands while simultaneously reconstructing a lowpass image. In one embodiment of the present invention, the order in which the constraints are applied is C3, C4, C2, C1, C5, and C6 for structured and busy textures, and C3, C4, C5, and C6 for unstructured and smooth textures.

The texture synthesis constraints are derived from the basic categories (vocabulary) and rules (grammar) used by humans when judging the similarity of color patterns. The following work, which more fully describes the vocabulary and grammar of color patterns is hereby incorporated by reference: Aleksandra Mojsilovic, Jelena Kovacevic, Jianying Hu, Robert J. Safranek, and S. Kicka Ganapathy, "Matching and retrieval based on the vocabulary and grammar of color patterns," *IEEE Transactions on Image Processing*, vol. 9, no. 1, pp. 38-54, Jan. 2000. In one embodiment, the basic pattern categories used by humans for similarity evaluation of color patterns are directionality, regularity and placement, complexity and heaviness and the basic color categories used by humans for the same task are overall color and color purity. The following table provides the meanings for these criteria:

| Similarity Criterion | Expresses | Derived Criterion for constrained texture synthesis |
| --- | --- | --- |
| Overall color | Perception of a single dominant color, or a multicolored image that creates the impression of a dominant color | Preserve the overall color in the synthesized texture |
| Directionality and orientation | Perception of the dominant orientation in edge distribution, or the dominant direction in the repetition of the structural element | Preserve the dominant orientation in the synthesized texture |
| Regularity and placement | perception of the placement (and small perturbation in placement), repetition and uniformity of the patterns | Not applied |
| Color purity (overall saturation) | Perception of the degree of colorfulness in patterns | Preserve the color saturation in the synthesized texture |
| Pattern complexity and heaviness | Perception of a general impression based on the type of overall color (light versus dark) or the overall chroma (saturated versus unsaturated) or the spatial frequency in the repetition of the structural element or the color contrast | Preserve the type of the overall color (light or dark) |

Because different visual pathways process patterns and colors in the human visual system, separate constraints for texture and color are derived in the texture synthesis process. Moreover, texture is typically synthesized with gray levels, i.e. luminance frames, and color constraints are imposed on the chrominance frames. In terms of texture, the synthesized texture should have similar dominant directionality as that of the original texture. In terms of color, the synthesized texture should have similar overall color and color saturation as those of the original texture.

To address the texture requirement, the magnitude correlation constraint (C3) which represents the structure in images and the cross-scale statistics constraint (C4) which allows distinguishing lines and edges are selected and applied. While these texture constraints are sufficient for unstructured and smooth textures, they do not allow synthesizing structured and busy textures with appearances that are similar to those of the original ones. Therefore, for structured and busy textures, the marginal statistics constraint (C1) and the coefficient correlation constraint (C2) are used. The correlation constraint characterizes the regularity of the texture as represented by periodic or globally oriented structure in the set of constraints. The overall color (C5) and color saturation (C6) are the color constraints that address the color requirements. The overall color constraint may be further expressed in terms of similar color moments (mean color and standard color deviation). Because the pixel values in the segmented regions have been replaced with mean pixel values within the region, the overall color is easily preserved. Because preserving only the mean color would yield textures with discolored appearances in the cases of textures that exhibit large color variations, the color situations are also preserved.

By selecting different sets of constraints for unstructured and smooth textures, and structured and busy textures, different characteristics of the background textures that are present in video sequences can be utilized. For example, by removing the marginal statistics constraint (C1), synthesized textures that differ in their first and second order statistics from the original textures can be obtained. Consequently, according to Julesz's conjecture, the synthesized and original textures would then be distinguishable in pre-attentive (undetailed) evaluation of less than 50 milliseconds (ms). At a frame rate of 24 frames per second, each frame is indeed viewed in a pre-attentive mode, i.e., for approximately 40 (<50) ms. By removing the coefficient correlation constraint (C2) for the same class of unstructured and smooth textures, the requirement that the synthesized and the original textures have similar periodicity is relaxed. This, in turn, improves the compression effectiveness.

The texture synthesized is mapped on the luminance frame of the video sequence. The segmented regions within the chrominance frames remain filled with pixels having mean values as obtained by the region segmentation. Thus, the color constraints are satisfied.

Although the present invention has been described in terms of a video sequence, it is understood by one of skill in the art that the systems and methods described herein also apply to a still image or to a single frame. Thus removing texture from a set of frames includes the case where the set of frames is a single frame or a still image.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for processing video data, the method comprising:
 removing texture from at least some frames of a set of frames in a video sequence;
 analyzing the removed texture to obtain texture parameters;
 synthesizing new texture based on the obtained texture parameters and at least one of the following qualitative constraints: coefficient magnitude correlations, cross scale statistics, coefficient correlations, marginal statistics, dominant texture orientation, overall color, and color saturation related to whether an original texture associated with the set of frames is structured and busy or unstructured and smooth,
 wherein if the original texture is structured and busy, then synthesizing the new texture is based on the following constraints: marginal statistics, coefficient correlations, coefficient magnitude correlations, cross-scale statistics, overall color, and color saturation; and
  wherein if the original texture is unstructured and smooth, then synthesizing the new texture is based on at least the constraints: coefficient magnitude correlations, cross-scale statistics, overall color and color saturation,: and
 inserting the synthesized new texture into the set of frames to enable display of the set of frames.

2. The method of claim 1, wherein the synthesized new texture is visually similar to the original texture.

3. The method of claim 1, wherein the synthesized new texture is similar to but distinguishable from the removed texture.

4. The method of claim 1, wherein a bit rate of a video sequence that includes the synthesized texture is less than a bit rate of an original video sequence.

5. The method of claim 1, wherein a region of interest is identified within texture of an initial frame.

6. The method of claim 5, wherein a mean vector is computed for the region of interest.

7. The method of claim 6, wherein the texture is synthesized and inserted further according to a method comprising:
 computing an angular map and a modulus map for an initial frame, wherein the angular map and the modulus map represent color characteristics;
 comparing color characteristics of the region of interest with color characteristics of all pixels in the initial frame; and
 including in the texture to be removed pixels whose color characteristics are similar to the color characteristics of the region of interest.

8. A tangible computer-readable medium storing instructions for controlling a computing device to process video data, the instructions comprising:
 removing texture from at least some frames of a set of frames in a video sequence;
 analyzing the removed texture to obtain texture parameters;
 synthesizing new texture based on the obtained texture parameters and at least one of the following qualitative constraints: coefficient magnitude correlations, cross scale statistics, coefficient correlations, marginal statistics, dominant texture orientation, overall color, and color saturation related to whether an original texture associated with the set of frames is structured and busy or unstructured and smooth,
 wherein if the original texture is structured and busy, then synthesizing the new texture is based on the following constraints: marginal statistics, coefficient correlations, coefficient magnitude correlations, cross-scale statistics, overall color, and color saturation; and
  wherein if the original texture is unstructured and smooth, then synthesizing the new texture is based on at least the constraints: coefficient magnitude correlations, cross-scale statistics, overall color and color saturation; and
 inserting the synthesized new texture into the set of frames.

9. The computer-readable medium of claim 8, wherein synthesized new texture is visually similar to the original texture.

10. The computer-readable medium of claim 8, wherein the synthesized new texture is similar to but distinguishable from the removed texture.

11. The computer-readable medium of claim 8, wherein a bit rate of a video sequence that includes the synthesized texture is less than a bit rate of an original video sequence.

12. The computer-readable medium of claim 8, wherein a region of interest is identified within texture of an initial frame.

13. The computer-readable medium of claim 12, wherein a mean vector is computed for the region of interest.

14. The computer-readable medium of claim 13, wherein the texture is synthesized and inserted further according to a method comprising:
 computing an angular map and a modulus map for an initial frame, wherein the angular map and the modulus map represent color characteristics;
 comparing color characteristics of the region of interest with color characteristics of all pixels in the initial frame; and
 including in the texture to be removed pixels whose color characteristics are similar to the color characteristics of the region of interest.

* * * * *